United States Patent [19]
Cardwell et al.

[11] 3,832,796
[45] Sept. 3, 1974

[54] FISHING ROD HOLDER

[76] Inventors: Joseph R. Cardwell, 2727 Sheridan, Des Moines, Iowa 50310; True J. Berry, 6103 Winona Ave., Des Moines, Iowa 51104

[22] Filed: Aug. 10, 1973

[21] Appl. No.: 387,526

[52] U.S. Cl. ............... 43/25, 24/81 CC, 24/129 D, 24/257 A, 43/54.5 R
[51] Int. Cl. ........................................... A01k 87/02
[58] Field of Search .................. 43/25, 25.2, 54.5 R; 24/257 R, 257 A, 81 CC, 129 D, 244

[56] References Cited
UNITED STATES PATENTS

| | | | |
|---|---|---|---|
| 870,033 | 11/1907 | Hildreth | 43/25.2 |
| 1,552,252 | 9/1925 | Webb | 24/257 A |
| 1,686,678 | 10/1928 | Burke | 267/74 |
| 2,556,403 | 6/1951 | Sokolik | 43/25.2 |
| 2,878,610 | 3/1959 | Herstedt | 43/25.2 |
| 3,113,363 | 12/1963 | Fyvie | 24/257 R |

*Primary Examiner*—Antonio F. Guida
*Assistant Examiner*—Daniel J. Leach
*Attorney, Agent, or Firm*—Zarley, McKee, Thomte & Voorhees

[57] ABSTRACT

A fishing pole having telescopic rod sections is disassembled and the rod sections are held in parallel side-by-side relationship by a pair of holders each having oppositely extending resilient jaws engaging the opposite ends of the rod sections. A hook is provided on each of the holders for wrapping the fish line. Each holder includes a solid block of resilient rubber material and channel-shaped arms extend from each side on each end of the block. Rollers are provided on the free ends of the arms between the flanges of the channels. The arms or jaws are yieldably moved to an open position upon insertion or removal of the rod section between them and the rod section is held tightly in place by the rollers pressing the rod section against the rubber block. The resiliency of the arms may be changed by providing a slot into the block along its centerline and the jaws will also accommodate a larger in diameter rod section.

9 Claims, 5 Drawing Figures

PATENTED SEP 3 1974  3,832,796

FISHING ROD HOLDER

A problem common to all fishermen is the storage of a fishing pole when traveling, at home or when the pole is otherwise not in use. The pole in its extended condition is awkward and cumbersome to handle and when disassembled is disorderly and easily tangled up in the fishing line and tackle.

It is thus apparent that the pair of holders of this invention will yieldably but firmly hold the pole sections closely adjacent each other for compact storage and ease in traveling. The holders each comprise a block of rubber material and opposite ends, each including a pair of channel-shaped arms embracing the block of rubber material. Rollers are provided in the outer free ends of each of the channel-shaped arms. The rollers function as jaws for receiving and holding the rod sections and the arms are yieldably spreadable due to the resiliency of the rubber block to which they are connected. The space between the arms may be increased by allowing the arms to spread further apart by including a slot along the centerline of the rubber block between the arms. A hook may be provided on the outer face of one of the channel-shaped arms for anchoring the fish hook and/or line thereby preventing it from becoming entangled.

It is also seen that the holders of this invention may be used in other fields such as in archery for holding arrows.

This invention consists in the construction, arrangements and combination of the various parts of the device, whereby the objects contemplated are attained as hereinafter more fully set forth, specifically pointed out in the claims, and illustrated in the accompanying drawings in which:

Figure 1:
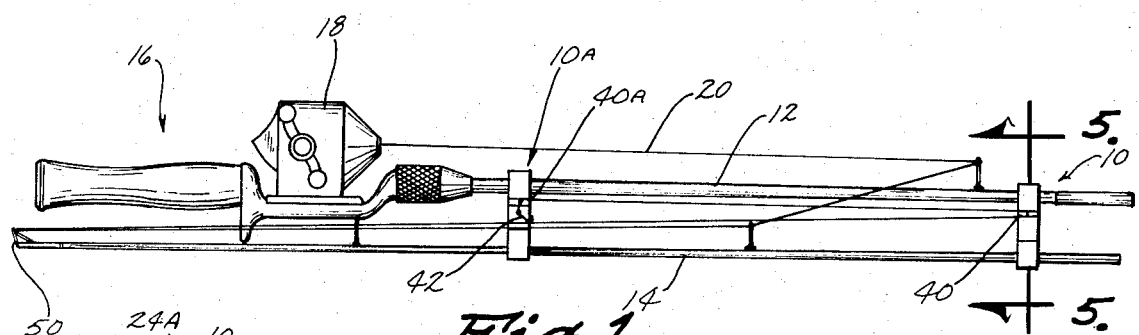
FIG. 1 is a side elevation view of a disassembled fishing pole being held by a pair of holders.
Figure 2:
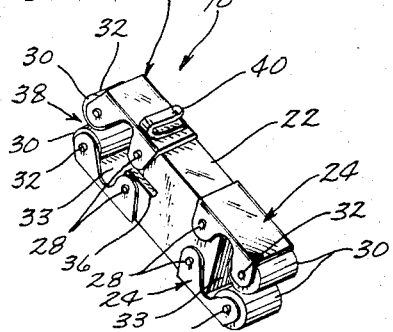
FIG. 2 is a perspective view of one of the holders.
Figure 3:
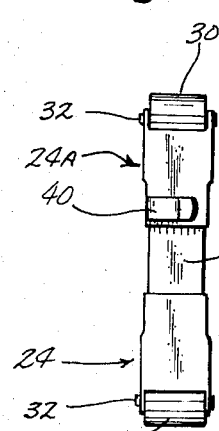
FIG. 3 is a side elevation view taken from the left as viewed in FIG. 4.
Figure 4:
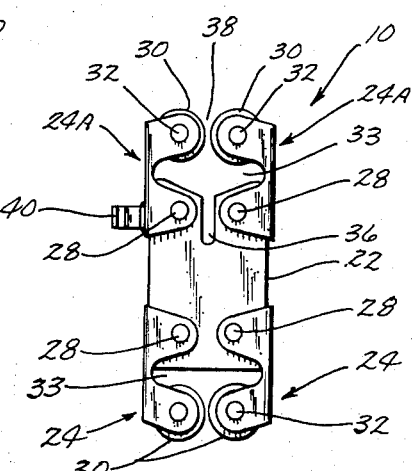
FIG. 4 is a side elevation view taken from the right as viewed in FIG. 3.

The holder of this invention is referred to generally in FIG. 2 by the reference numeral 10 and is seen in FIG. 1 holding the two rod sections 12 and 14 of a fishing pole 16 having a conventional reel 18 and fishing line 20.

Figure 5:
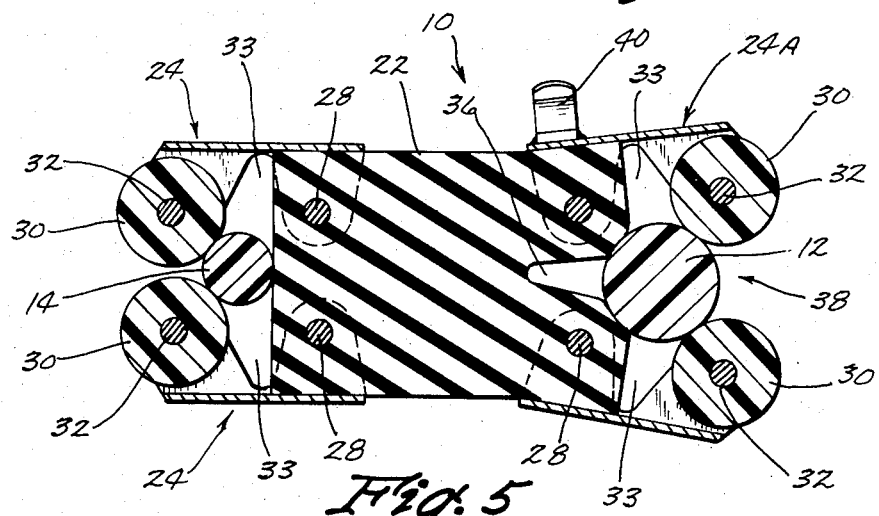
FIG. 5 is a cross sectional view taken along line 5 — 5 in FIG. 1.

The holder 10 comprises a rectangular in cross section block of rubber or the like material 22 which has the property of being resilient. A pair of arms 24 is provided at one end of the block 22. The arms are channel-shaped with the side flanges embracing at one end the rubber block 22. A pin 28 extends through the side flanges and the block resiliently but firmly holding the arms 24 to the block. The opposite free end of the arms 24 includes a roller 30 rotatably positioned on a pin 32 extending between and through the side flanges. A portions of the side flanges is cut away between the pins 28 and 32 thereby giving the flanges the appearance of ears engaging the rubber block and the rollers. The portion of the flanges cut away leaves V-shaped notches 33 in a transverse plane which includes the item being clamped as seen in FIG. 5 wherein the fishing rod sections 12 and 14 are held firmly by the rollers 30 being spring biased inwardly against the rod section 12 which is pressed against the end surface of the rubber block 22. It is thus seen that the rod sections or any other item that is to be held may be readily held in place or removed by pressing it between the rollers 30.

As is further seen in FIG. 5, the opposite end of the block 22 is similarly constructed with the exception that to accommodate larger in diameter items such as the inner end section 12 of the fishing rod 16, the jaws in the nature of the rollers 30 need to spread further apart and this is accomplished by providing a slot 36 on the longitudinal centerline 38 of the block 22.

The holders 10 and 10A in FIG. 1 include oppositely facing hooks 40 and 40A on arms 24A for wrapping the outer end of the fishing line 20.

In operation, it is seen that the fishing pole is disassembled and the rod sections 12 and 14 are placed in side-by-side relationship with the two holders 10 and 10A being put into engagement with the rod sections at their opposite ends. The rod sections are easily inserted into the holders by applying pressure to the rod sections when they are positioned on the rollers 30. The rollers will deflect outwardly due to the resiliency of the rubber material in the block 22 thereby allowing the rods to be locked in the holders as seen in FIG. 5 wherein the rollers and the adjacent end of the block engage opposite sides of the rod. The end of the fishing line having the fish hook 42 is wrapped around the hooks 40 and 40A facing in opposite directions as seen in FIG. 1. Should the fishing line not have any tackle on it then the fish hook 42 may be drawn tight against the outer eye element 50 on the outer rod section 14 but if tackle such as weights remains on the fishing line, a length of line will not pass through the eye 50 and can be stored by wrapping it around the hooks 40 and 40A as seen in FIG. 1. Alternatively, the fishing line beyond the eye 50 may be of such a length that the fish hook 42 can be engaged in one of the hooks 40 or 40A and the line pulled tight by the reel 18.

We claim:

1. A holder comprising, a block of resilient material, a pair of rigid arms connected to opposite sides of said block in spaced relation and having free ends extending away from said block to provide clamping jaws, said arms being channel-shaped with side flanges and the side flanges embracing said block, a pin extending through said side flanges and block to secure said arms to said block, and said clamping jaws being normally closely spaced and adapted to be yieldably spread apart for access between said jaws and arms by an item being held.

2. The structure of claim 1 wherein said clamping jaws are further defined as being rollers on the free ends of said arms for engaging an item being held.

3. The structure of claim 1 wherein said block is further defined as having a slot formed along its longitudinal center between said arms.

4. The structure of claim 1 and a roller is provided between said flanges at the outer free ends of said arms.

5. The structure of claim 1 wherein said block is further defined as including a second pair of rigid arms connected to opposite sides of said block in spaced relation and having free ends extending away from said block to provide clamping jaws.

6. The structure of claim 5 wherein one of said arms of one of said pairs of arms includes a hook.

7. The structure of claim 5 wherein one end of said block includes a longitudinally extending slot extending between said arms whereby said jaws and arms may be more easily resiliently spread apart.

8. The structure of claim 5 wherein a disassembled fishing pole including two rod sections are held in parallel relationship by two of said holders, said holders being positioned at opposite ends of said rod sections and each pair of jaws engaging an end of a rod section.

9. The structure of claim 8 wherein one of said arms of one of said pairs of arms includes a hook and said fishing rod includes a fishing line having a fish hook thereon, said fish hook being in engagement with said holder hook.

* * * * *